(12) United States Patent
Tharp

(10) Patent No.: US 11,845,043 B2
(45) Date of Patent: Dec. 19, 2023

(54) LARGE BUBBLE MIXER AND METHOD OF USING SAME IN A WASTEWATER TREATMENT SYSTEM

(71) Applicant: Environmental Dynamics International, Inc., Columbia, MO (US)

(72) Inventor: Charles E. Tharp, Columbia, MO (US)

(73) Assignee: ENVIRONMENTAL DYNAMICS INTERNATIONAL, INC., Columbia, MO (US)

( * ) Notice: Subject to any disclaimer, the term of this patent is extended or adjusted under 35 U.S.C. 154(b) by 0 days.

(21) Appl. No.: 17/740,103

(22) Filed: May 9, 2022

(65) Prior Publication Data
US 2022/0266208 A1    Aug. 25, 2022

Related U.S. Application Data

(63) Continuation-in-part of application No. 16/413,747, filed on May 16, 2019, now Pat. No. 11,325,079.

(51) Int. Cl.
*B01F 3/04*         (2006.01)
*B01F 23/231*       (2022.01)
(Continued)

(52) U.S. Cl.
CPC ............. *B01F 23/231122* (2022.01); *B01F 23/231263* (2022.01); *C02F 3/1284* (2013.01);
(Continued)

(58) Field of Classification Search
CPC ...... B01F 23/231122; B01F 23/231263; B01F 2101/305; B01F 2215/0481; C02F 3/1284; C02F 3/201; C02F 2203/006
See application file for complete search history.

(56) References Cited

U.S. PATENT DOCUMENTS 4,486,361 A  12/1984 Durot et al.
4,869,852 A   9/1989 Goudy, Jr. et al.
(Continued)

OTHER PUBLICATIONS

Geyser Pump, Wastewater Product Catalog, 2014, 22 pages, Geyser Pump Tech, LLC.
(Continued)

*Primary Examiner* — Charles S Bushey
(74) *Attorney, Agent, or Firm* — Husch Blackwell LLP

(57) ABSTRACT

A mixer configured for releasing large bubbles into wastewater is provided. The mixer can include a central draft tube, an upwardly-extending member surrounding the draft tube, and an accumulator surrounding both the upwardly-extending member and the draft tube. A lower end of the draft tube sidewall may be sealed and not include any openings beneath the lower end of the upwardly-extending member, so as to prevent liquid pumpage through the draft tube. A method for treating wastewater in a system that includes at least one large bubble mixer and at least one fine bubble diffuser is also provided. The large bubble mixer and fine bubble diffuser may be supplied gas independently from one another. The method can include multiple modes of operation wherein gas is either supplied to the mixer, to the diffuser, to neither the mixer or the diffuser, or to both the mixer or the diffuser.

7 Claims, 6 Drawing Sheets

(51) Int. Cl.
   *C02F 3/20* (2023.01)
   *C02F 3/12* (2023.01)
   *B01F 101/00* (2022.01)

(52) U.S. Cl.
   CPC ........ *C02F 3/201* (2013.01); *B01F 2101/305* (2022.01); *B01F 2215/0481* (2013.01); *C02F 2203/006* (2013.01)

(56) References Cited

U.S. PATENT DOCUMENTS

| | | | |
|---|---|---|---|
| 4,917,832 A | 4/1990 | Marcum et al. | |
| 6,036,357 A | 3/2000 | Van Drie | |
| 6,162,020 A | 12/2000 | Kondo | |
| 6,322,056 B1 | 11/2001 | Drie | |
| 6,406,624 B1 | 6/2002 | Devos | |
| 6,554,259 B2 | 4/2003 | Van Drie | |
| 7,121,532 B2 | 10/2006 | Oades | |
| 7,294,255 B2 | 11/2007 | Kondo | |
| 7,374,675 B2 | 5/2008 | Koopmans et al. | |
| 8,016,273 B1* | 9/2011 | Dartez | B01F 23/23105 261/122.1 |
| 8,047,808 B2 | 11/2011 | Kondo | |
| 8,292,271 B2 | 10/2012 | Fujisato et al. | |
| 9,073,024 B2 | 7/2015 | Drewry et al. | |
| 9,566,554 B2 | 2/2017 | Wu et al. | |
| 11,325,079 B2* | 5/2022 | Tharp | B01F 23/2311 |
| 2011/0049047 A1 | 3/2011 | Cumin et al. | |
| 2013/0153494 A1 | 6/2013 | Wang et al. | |
| 2020/0114319 A1 | 4/2020 | Galbreath-O'Leary et al. | |
| 2020/0140306 A1* | 5/2020 | Dartez | C02F 7/00 |
| 2020/0238229 A1 | 7/2020 | Hill | |
| 2021/0276902 A1 | 9/2021 | Neu et al. | |

OTHER PUBLICATIONS

"MARS(TM) Aerator Features". Triplepoint Water Technologies, LLC, pp. 1-3. [[Accessed at http://www.triplepointwater.com/mars-aeration-brochure/#.XVG-2K9Ya84 on Aug. 12, 2019]].

* cited by examiner

LARGE BUBBLE MIXER AND METHOD OF USING SAME IN A WASTEWATER TREATMENT SYSTEM

CROSS-REFERENCE TO RELATED APPLICATIONS

This application is a Continuation-in-Part and claims priority to U.S. patent application Ser. No. 16/413,747 filed May 16, 2019, to Charles E. Tharp entitled "Combined Coarse and Fine Bubble Diffuser," now issued as U.S. Pat. No. 11,325,079, the entire disclosure, including the specification and drawings, of which is incorporated herein by reference.

BACKGROUND

In the treatment of wastewater, coarse and large bubble mixing provides displacement, turbulence, or otherwise mixes of the wastewater. The mixing generated by coarse or unique big bubble mixers provides controlled mixing wastewater in a treatment area. While the turbulence generated by coarse or big bubble mixers can provide circulation and mixing, it can also limit sludge accumulation. This circulation and turbulence aids in keeping sludge and solids suspended in the treatment area, by flocculating and dispersing oxygen, biomass, and substrate throughout the wastewater. This secondary flocculation benefit provides modest oxygen transfer for improving efficiency and promotes bacterial growth for the breakdown of waste in the wastewater. Big bubble mixers are effective for, and can be used in, a variety of applications and settings, ranging from lagoons, concrete tanks, basins, and other wastewater treatment facilities and systems.

The general practice of using coarse or big bubble mixers is known in the art and utilizes multiple methods and devices. One such big bubble generation system utilizes a high pressure compressor that sequentially injects compressed air between two forming plates thereby producing a large bubble. These systems are complex and typically require an elaborate control panel and air distribution system. Furthermore, these systems require a high pressure compressor that is independent from, and in addition to, any lower pressure blowers associated with an aeration system.

Another big bubble generation system utilizes a geyser airlift pump to generate bubbles that are discharged through a large tower stack. This is achieved through the use of a water intake or inlet located near the bottom of the device, drawing in water and acting as an airlift pump, pushing both drawn-in water and supplied gas through the geyser stack and then discharging them into the wastewater as a mixture of water and air. Bubble generators using this geyser pump method consist of pipes, tubes or tower stacks extending upwardly from the bubble generator. These tower stacks add time, labor, and material cost during both construction and maintenance. Further yet, the water intake inlets located near the bottom of the devices can be prone to letting materials, debris, fibers, rags, and larger objects into the device, thereby creating potential for blockages or stoppages if such materials or solids clog or plugs the internal piping or tubing of the bubble generator. Furthermore, known devices that have tower stacks release the generated bubbles from an upper opening of the stack, which may be located a substantial distance above the floor of the basin, tank or lagoon. Thus, these known devices may release the bubbles at a vertical location such that mixing may generally only occur within an upper portion of the treatment zone.

Accordingly, a need exists for a coarse or big bubble mixer system that provides the desired mixing and churning of wastewater in a cost effective, simple, energy efficient, and reliable manner. A need also exists for a coarse or large bubble generation system that resists stoppages and clogging. A further need exists for a coarse or large bubble generation system that may be adapted for mixing vertical locations throughout a treatment zone. An additional need exists for a wastewater treatment system and method that can be adapted for operating in various manners to achieve desired levels of mixing and aeration within a treatment zone.

SUMMARY OF THE INVENTION

One embodiment of the present invention is generally directed to a large bubble mixer configured for releasing large bubbles into wastewater. The large bubble mixer may include a central draft tube having a vertically-extending sidewall, an upwardly-extending member surrounding at least a portion of the draft tube, an inner chamber area defined between the draft tube and the upwardly-extending member, an accumulator having a downwardly-depending peripheral skirt surrounding at least a portion of the draft tube and at least a portion of the upwardly-extending member, an outer chamber area defined between the upwardly-extending member and the peripheral skirt of the accumulator, and at least one air inlet defined in the draft tube in an area generally surrounded by the upwardly-extending member. A lower end of the draft tube sidewall may be sealed beneath the lower end of the upwardly-extending member. Accordingly, in one embodiment, the lower end of the draft tube sidewall does not have any through openings defined beneath the lower end of the upwardly-extending member. The sealed lower end of the draft tube may generally prevent liquid pumpage through the draft tube. In one embodiment, the draft tube does not extend above an upper end of the accumulator.

The large bubble mixer may be configured to release the large bubbles into the wastewater at an exit velocity that generates an impulse or shockwave within the wastewater. In one embodiment, the large bubble mixer is configured to release the large bubbles at an exit velocity of between about 10 ft/s and about 40 ft/s and, in another embodiment, at an exit velocity of between about 20 ft/s and about 30 ft/s.

The present invention is also generally directed to a system and method for treating wastewater in a wastewater treatment system. The method can include multiple modes of operation and comprise the steps of providing at least one large bubble mixer configured for releasing large bubbles into the wastewater for mixing the wastewater, and providing at least one fine bubble diffuser configured for discharging gas into the wastewater for aerating the wastewater. The large bubble mixer and fine bubble diffuser may be supplied gas independently from one another.

During a first mode of operation, the method includes the step of preventing gas from being supplied to the at least one large bubble mixer and preventing gas from being supplied to the at least one fine bubble diffuser, so that the wastewater is generally neither mixed nor aerated. During a second mode of operation, the method includes the step of supplying gas to the at least one large bubble mixer and preventing gas from being supplied to the at least one fine bubble diffuser, so that the wastewater is mixed but generally not aerated. During a third mode of operation, the method includes the step of supplying gas to the at least one fine bubble diffuser and preventing gas from being supplied to the at least one large bubble mixer, so that the wastewater is aerated but generally not mixed. During a fourth mode of operation, the method includes the step of supplying gas to the at least one large bubble mixer and supplying gas to the at least one fine bubble diffuser, so that the wastewater is both mixed and aerated.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE INVENTION

Figure 1:
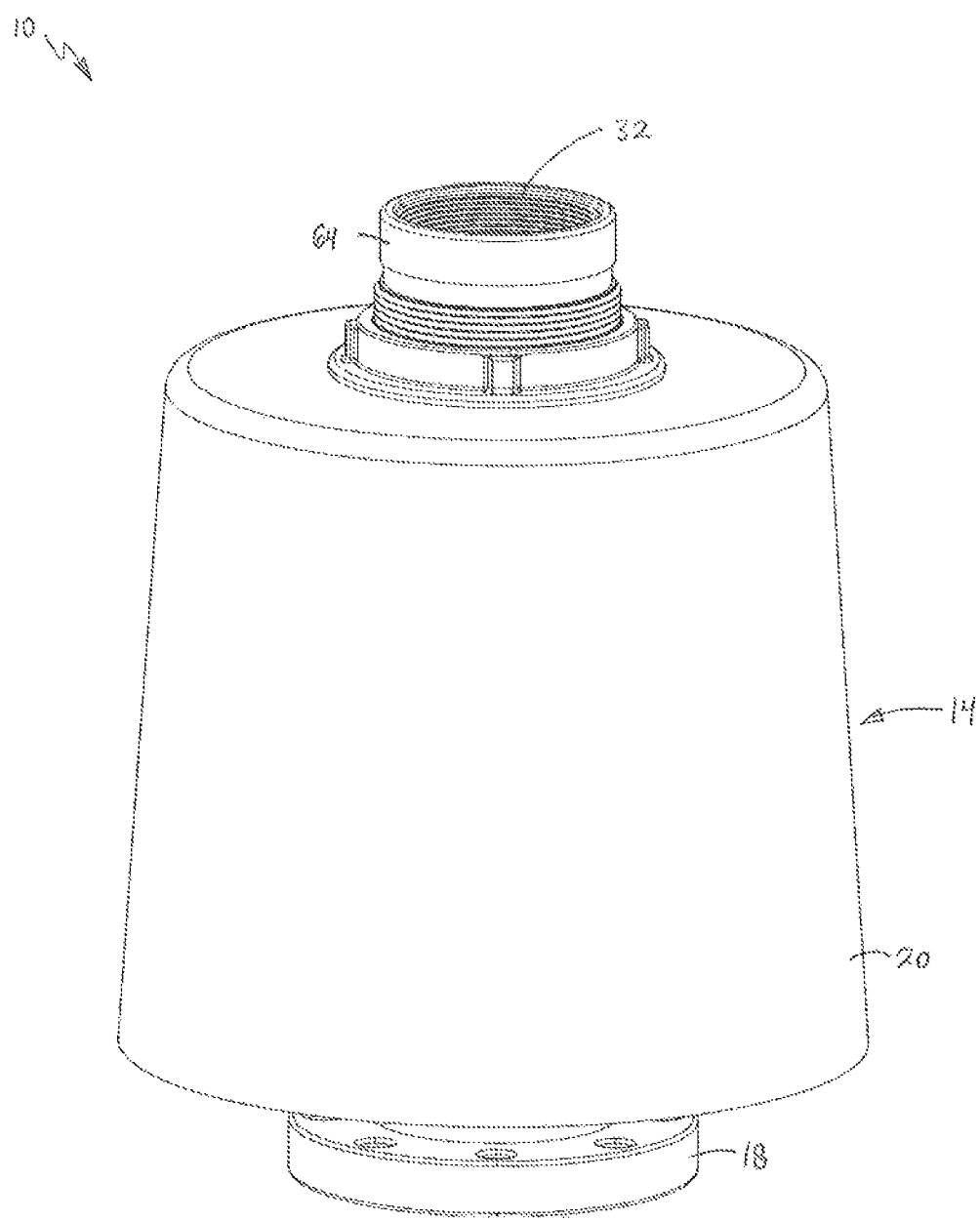
FIG. 1 is a perspective view of a large or big bubble mixer in accordance with one embodiment of the present invention.

The invention will now be described with reference to the drawing figures in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a large, big or coarse bubble mixing system, specifically to a large bubble mixer and process of using one or more large bubble mixers in a wastewater treatment system. As will be described in greater detail below, one embodiment of the large bubble mixer of the present invention incorporates an inner pipe having a circumferentially sealed or otherwise solid lower end to reduce, minimize, or even generally eliminate water pumpage through the unit during bubble generation. In addition to comprising a sealed lower end, the large bubble mixer can further have a low-profile design, comprising a non-extending opening defined in a top end of the large bubble mixer. The present invention is further directed to a system and method of treating wastewater using a combination of fine bubble diffusers and large bubble mixers in communication with separate or individual networks or lines for supplying gasses, such that the fine bubble diffusers and large bubble mixers can be operated independently from one another and may further operate in various modes of operation.

Large Bubble Mixer or Big Bubble Mixer

Figure 2:
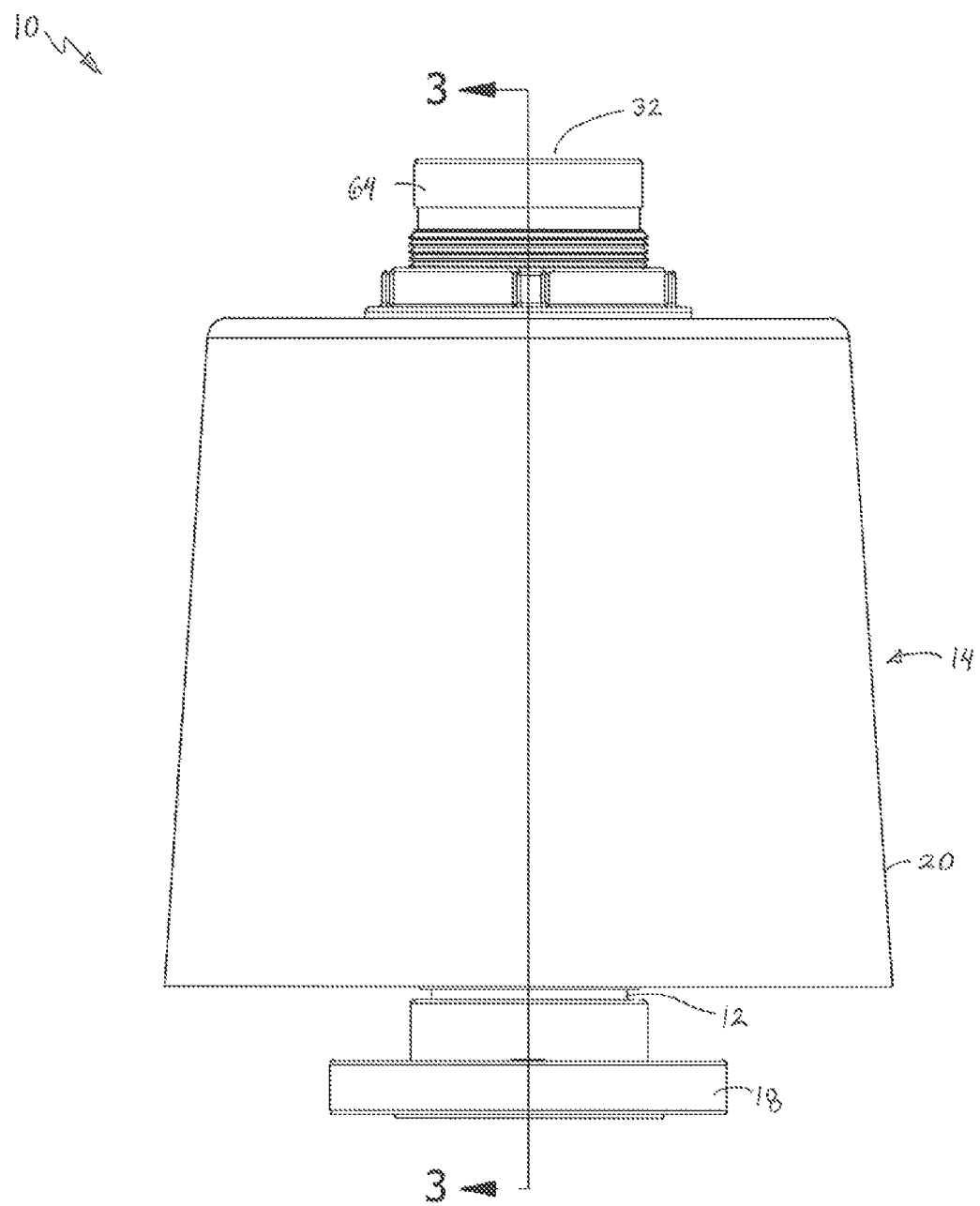
FIG. 2 is a side view of the large or big bubble mixer of FIG. 1.
Figure 3:
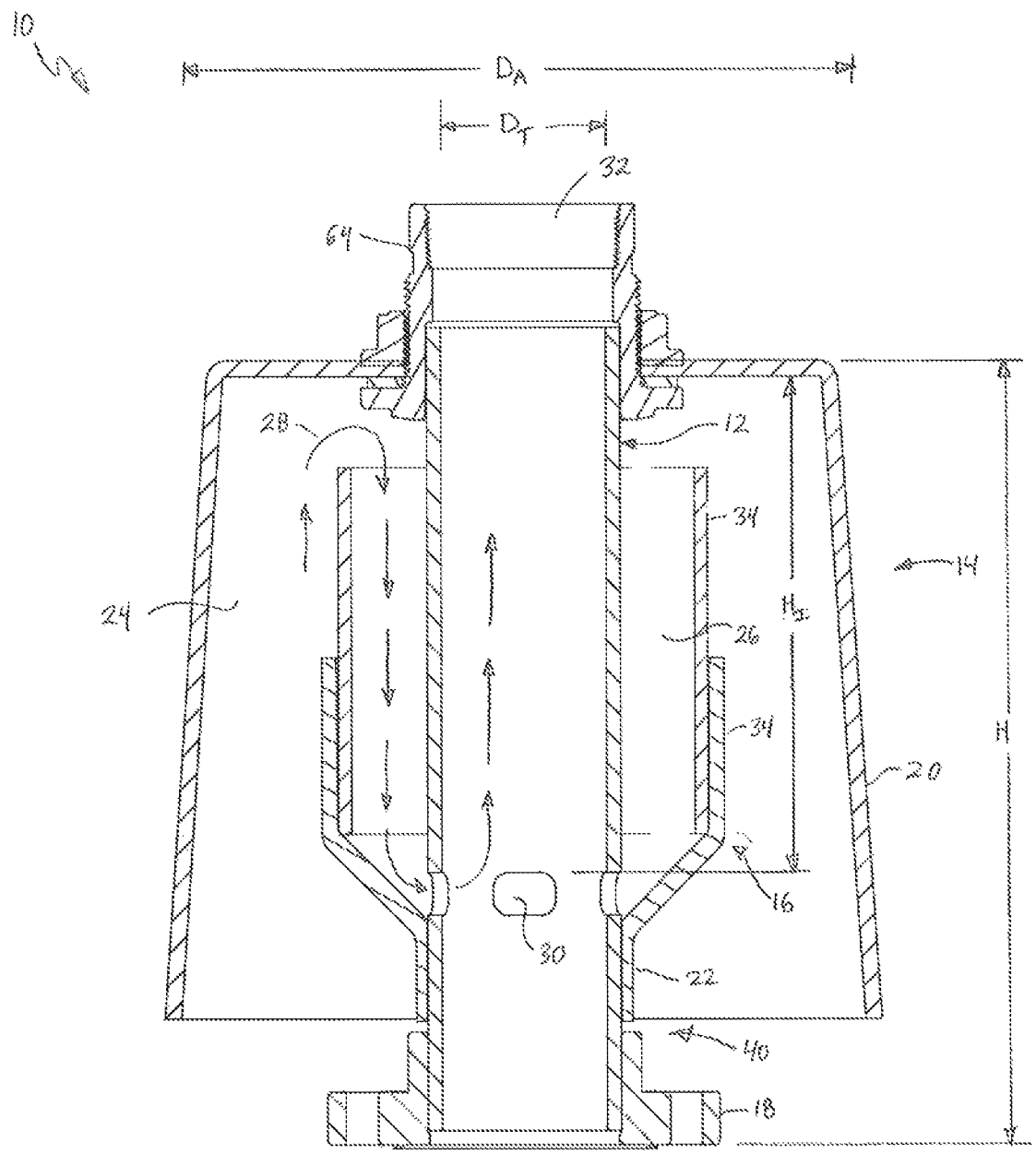
FIG. 3 is a sectional view of the large or big bubble mixer of FIG. 1 taken generally along line 3-3 in the direction of the arrows.
Figure 4A:
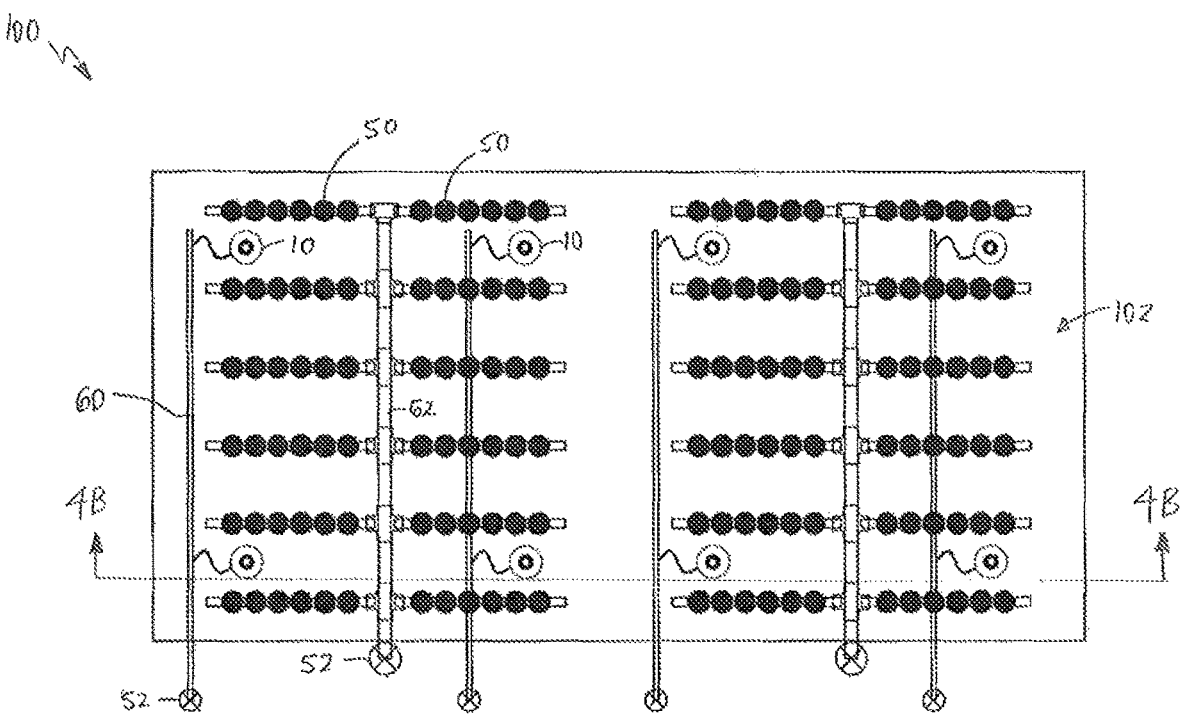
FIG. 4A is a schematic top plan view of a portion of a wastewater treatment system utilizing a plurality of large or big bubble mixers and a plurality of fine bubble diffusers in accordance with one embodiment of the present invention.
Figure 4B:
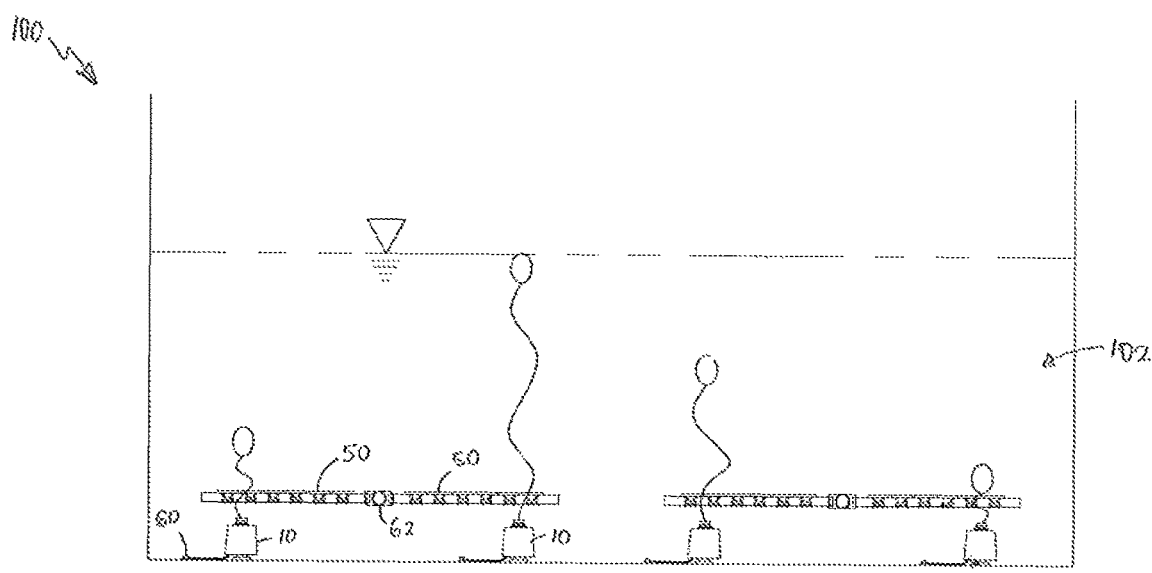
FIG. 4B is a schematic side sectional view of the portion of the wastewater treatment system of FIG. 4A taken generally along line 4B-4B in the direction of the arrows.

As generally illustrated in FIGS. 1-3, one aspect of the present invention is directed to a large bubble mixer 10. In one embodiment, large bubble mixer 10 is used in wastewater treatment systems and provides mixing of the wastewater through the generation and discharge of large bubbles into the wastewater. In discharging large bubbles, large bubble mixer 10 can be used for both modest oxygen transfer, but more importantly, also for disturbing, disrupting, or otherwise mixing the wastewater and displacing and dispersing oxygen, biosolids and substrates present in the wastewater. In some embodiments, the large bubble mixer 10 may generate an impulse or shockwave within the wastewater due to the velocity at which the large bubble may exit the large bubble mixer 10. Such impulses or shockwaves lead to enhance or further disruption or mixing within the wastewater. Large bubble mixer 10 may be constructed from any suitable materials including, but not limited to, polymers, PVC, CPVC, ABS, stainless steel, galvanized iron, galvanized steel, and other suitable materials.

As described herein, large bubble mixer 10 can be used for the intermittent releasing of large bubbles that mix the wastewater. The large bubble mixer 10 may discharge one or more large bubbles per discharge cycle. As demonstrated in FIG. 3, large bubble mixer 10 comprises a generally upwardly-extending central draft tube 12, an accumulator 14, and an upright cup-shaped member 16 arranged therebetween.

Large bubble mixer 10 may be used in a variety of wastewater treatment settings, including without limitation, lagoons, concrete basins, tanks, or other settings. Because of large bubble mixer's 10 versatility and ability to be used in a variety of settings, it will be appreciated that the method of installing large bubble mixer 10 can be equally as versatile depending on the embodiment and setting. One method of mounting large bubble mixer 10 may consist of coupling large bubble mixer 10 to a base 18, which in turn may be attached to the floor of the basin, tank, or lagoon. However, in another method of mounting, large bubble mixer 10 could be suspended from a floating lateral. It will be appreciated that these are non-limiting examples of installation, and that any suitable method of installation may be used.

As further demonstrated in FIG. 3, the accumulator 14 surrounds a portion of the draft tube 12 and can be attached thereto. The accumulator 14 may be in the form of an outer open bottom, inverted cup-shaped member having a downwardly-extending peripheral wall or skirt 20. While the skirt 20 of the accumulator 14 shown in the figures has a generally flared configuration and circular cross-sectional shape, it will be understood the skirt 20 in other embodiments may be of a different shape, such as oval, square, rectangular, polygonal, or other suitable shape and that its skirt 20 may be of any suitable profile or depend downwardly at any suitable angle. It will be appreciated that the volume of the accumulator 14 may be adjusted to control the size of the big or large bubble formed.

The upright cup-shaped member 16 may also surround a portion of the draft tube 12 and can also be attached or coupled thereto. The upright cup-shaped member 16 can include a closed lower wall or end 22 and an upwardly-extending peripheral wall or skirt 34. An outer open chamber 24 can be generally defined between upright cup-shaped member 16 and the accumulator skirt 20. An inner chamber 26 may be generally defined between the draft tube 12 and the upright cup-shaped member 16.

In one embodiment, large bubble mixer 10 operates as an inverted siphon to generate one large bubble to be discharged into the wastewater at a rate of one discharge per discharge cycle. In other embodiments, more than one bubble may be discharged per cycle. In this method, large bubble mixer 10 receives air, oxygen, and/or other gases into the accumulator 14 from below or from a gas or air line connected directly to the accumulator 14 (e.g., attached to an upper end of the accumulator 14 or elsewhere relative to the accumulator 14). As described in greater detail below, the gas or oxygen may be supplied by pipes 60, fine bubble diffusers 50, or other suitable methods of supplying gas or oxygen. Accumulator 14 captures the gas and begins to fill with the captured gas. In cases where the gas is supplied through a line connected to the upper end of the accumulator 14, the gas fills the accumulator 14 displacing or pushing the water downward out of the accumulator 14. In cases where the gas is supplied from below the accumulator 14, the gas proceeds upwardly, filling an upper end of the accumulator 14 and displacing or pushing the water downward out of the accumulator 14.

Then eventually, when enough gas has filled the accumulator 14 such that it reaches the inlet 30, the air pocket or seal is broken, and the gas accumulated in the accumulator 14 is instantly released through the inlet 30. The upward static pressure from the water below pushes the gas in the direction of the arrows 28 (see FIG. 3), through inner chamber 26, and into the draft tube 12 via the inlet 30. In other words, as the accumulator 14 reaches maximum capacity, the internal pressure causes the gas in the accumulator 14 to enter the draft tube 12 via the inlet 30, creating a siphon causing a release of all or most of the gas in the accumulator 14 as one large bubble. As further described below, the volume of the single large bubble can have generally about the same volume as the specified volume defined within the accumulator 14.

When the gas enters draft tube 12, it rises up through draft tube 12 until it reaches an opening 32 defined at the top of the draft tube 12 and is released into the wastewater in the form of one large bubble (or multiple large bubbles). As demonstrated in the embodiment shown in FIG. 3, opening 32 may generally be defined at the top of accumulator 14 and, as such, draft tube 12 generally does not extend past the top of accumulator 14, or at least not any substantial distance thereabove. Further, opening 32 can comprise the same general geometric shape as draft tube 12 or may be of a different geometric shape. Upon the large bubble exiting draft tube 12 and entering the wastewater, it may burst and be broken up into two or more traditional coarse bubbles (not shown). The bursting of the single large bubble, plus the resultant of the multiple coarse bubbles, acts as a disruptor in the wastewater, displacing and mixing the wastewater and the contents therein. As described in greater detail below, depending upon the exit velocity of the large bubble from the draft tube 12, the release of the large bubble may generate an impulse or shockwave within the wastewater that results in further disruption or mixing within the wastewater. The multiple coarse bubbles can mix the wastewater with adequate submergence in the liquid. The accumulation and discharge of air can be described as pulsing, in that subsequent large bubbles are generated and released in a generally consistent and pulsating manner.

It is common that wastewater in wastewater treatment systems contain more than just water, including, without limitation, sludge, mud, debris, and other solids mixed in with the wastewater. With this debris mixed in with the wastewater, there is risk that debris can be drawn into the water intake outlet along with the wastewater. As described above, such debris drawn into a mixer increases the risk of blockages, stoppages, or other barriers in coarse bubble mixers. This buildup in the mixer can create blockages, preventing or reducing the effectiveness and efficiency of the mixer. Further, such buildup requires manual cleaning, creating labor and time costs. Even further, coarse bubble mixers are oftentimes located near or at the bottom of lagoons or in large treatment tanks, making access to the coarse bubble mixers all the more challenging when blockages do occur. Previously-known mixers utilizing geyser pumps include at least one additional opening or a water intake inlet, usually located near or at the bottom of the mixer. This additional water intake inlet present in previously-known mixers is used for drawing in wastewater, such that water, sludge, or other material is pumped through the mixer and the resulting expulsion is a mixture of both water/sludge and air. An example of such a water intake inlet or opening is illustrated between the base and the lower end of the accumulator in the mixer shown in U.S. patent application Ser. No. 16/413,747 filed May 16, 2019, to Charles E. Tharp entitled "Combined Coarse and Fine Bubble Diffuser."

One embodiment of the large bubble mixer 10 of the present invention, shown in FIGS. 1-3, may be adapted for providing large bubble mixing with minimal or no pumpage of wastewater therethrough, thereby reducing or eliminating the chances of blockages therein. In one embodiment, large bubble mixer 10 comprises one or more inlets 30 located within the interior of accumulator 14, but does not include a lower water intake inlet for pumpage. Instead, this embodiment of large bubble mixer 10 comprises a circumferentially sealed or otherwise solid lower end 40, which can drastically reduce or may even generally eliminate water/solids pumpage through the unit. As demonstrated in FIG. 3, draft tube 12 extends to a bottom of large bubble mixer 10 and includes a lower end 40 constructed of a cylindrical tube having a peripheral or circumferentially-extending sidewall without any inlets, holes or apertures extending therethrough. As such, the lower end 40 of draft tube 12 is generally peripherally and/or circumferentially sealed such that no wastewater or other material is received through the lower end 40 of draft tube 12. Accordingly, in one embodiment, the wastewater is only received into the draft tube 12 through the one or more inlets 30. In one embodiment, draft tube 12 comprises or consists of openings only at the top end and at the inlet(s) 30. As such, little to no wastewater, sludge, or other solid or semi-solid material is drawn through large bubble mixer 10, and the discharged large bubble consists almost entirely of gas or oxygen, rather than a mixture of water/sludge and gas. Such an embodiment may be particularly suited for use in environments that may have materials, debris, fibers, rags, and larger objects in the wastewater, as it can reduce or eliminate the chances of blockages or stoppages due to such materials clogging, plugging or fowling the internal piping or tubing of large bubble mixer 10, such as draft tube 12 or any inlets defined therein. Such environments may include those that have heavy solids, slurries, digesters, and anoxic applications.

To further reduce or eliminate the chances of materials being drawn into large bubble mixer 10 that may clog or plug it, large bubble mixer 10 may be designed such that the velocity of the wastewater approaching the unit (i.e., the velocity of the wastewater approaching the base of the accumulator 14) is very low. With a traditional airlift pump, significant volumes of wastewater are pumped therethrough thereby resulting in a significant velocity in the medium (i.e., wastewater, etc.) surrounding the pump. This can cause solids and other materials to migrate toward the upper end of the accumulator in such a device. In particular, the pumpage causes those solids and other materials to be suspended and creates a velocity to draw them to the base of the unit itself. The solids or materials can then enter under the accumulator and can also enter the discharge stack of the device when complete pumpage or ejection of the solids may not occur resulting in eventual clogging, plugging, or fowling. To the contrary, with the embodiment of large bubble mixer 10 illustrated in FIGS. 1-3, because there is little to no pumpage, the velocity of the wastewater approaching skirt 20 of accumulator 14 may be as low as a small fraction of a foot per second. In one embodiment, the velocity of the wastewater approaching skirt 20 may be between about 0.005 ft/s and about 0.5 ft/s in one embodiment, between about 0.01 ft/s and about 0.1 ft/s in another embodiment, and between about 0.01 ft/s and about 0.05 ft/s in yet another embodiment. This velocity is well below (even multiples times below) the velocity necessary to keep such solids or materials suspended in the wastewater, which could be about 1 ft/s depending on the type of solid or material. This low velocity is driven by factors such as the diameter (or cross-sectional area) of skirt 20, volume of accumulator 14, diameter of the draft tube 12, and the number of cycles per minute, among other possible factors.

It will be appreciated that draft tube 12 may include multiple inlets 30 or may include only one single inlet 30. In some applications, a single inlet 30 may be preferred. In such embodiments, the single inlet 30 may be larger in size as compared to the size of the inlets 30 in embodiments that include multiple inlets 30. Other embodiments may include two, three, four, or more inlets 30. It will be appreciated that multiple inlets 30 can be effective when mixer 10 is operating on a very level basin floor and draft tube 12 is maintained in a vertical orientation. However, if the floor is not level and draft tube 12 is not vertical, then the air exiting accumulator 14 first exits the inlet 30 that is the highest (i.e., where the siphon first breaks). Operating in this fashion results in a constriction in the air discharge and the unit may become flooded before all of the air is discharged from accumulator 14. Additionally, this can result in the size of the bubble(s) discharged from the mixer being smaller (or can even turn into a continuous stream of gas bubbles) and the discharge from mixer 10 being inconsistent. To overcome this issue, mixer 10 according to one embodiment of the present invention includes only one, single inlet 30. With this embodiment, there is only one release point regardless of the angle mixer 10 is installed at and the angle draft tube 12 is extending. Once the air seal is broken on that single inlet 30, it uses that entire air inlet 30 and will continue to function even at a rather substantial angle from vertical. It utilizes entire inlet 30, is nonrestricted, and mixer 10 may continue to discharge the approximate volume of air it was designed for. Additionally, a larger single inlet 30 can handle larger sized solids and does not restrict the velocity and discharge of the large bubble.

One embodiment of large bubble mixer 10 of the present invention may include a low profile design, devoid of any stacks or elongated tubes extending from accumulator 14, and instead can comprise a draft tube 12 that terminates generally at or near the top edge of accumulator 14. With this design, as the siphon effect causes a large bubble to enter draft tube 12 through inlet 30, the large bubble must only travel the general distance equivalent to the height of accumulator 14 before being discharged through opening 32. This low-profile design can provide numerous benefits. First, with a low-profile design, the large bubble is discharged at a relatively low vertical location or maximum depth within the treatment zone. This can permit the discharged large bubbles to provide mixing and even dispersion of oxygen throughout a greater portion the profile or gradient of the treatment zone. In other words, it is possible to create the benefits of the mixing and/or flocculating throughout a lower portion, middle portion, and upper portion of the treatment zone. Second, the low-profile design can require less time, materials, and labor in manufacturing, saving both cost and labor. Third, the low-profile design may aid in installation as compared to existing coarse bubble mixers. For example, geyser pumps in the prior art comprise large stack towers of significant height. The height of the stack towers can become unwieldy and can provide for difficult installation. Further, geyser pumps with significant heights cannot be installed in shallow tanks or tanks comprising low volumes of water. In the event that the geyser pump extends out of the water, the mixing capabilities of the geyser pump is significantly reduced or even generally nullified. Fourth, the low-profile design of large bubble mixer 10 provides reduced surface area for sludge, solids, or other buildup, and reduces the need for cleaning.

In one embodiment, the large bubble mixer 10 may optionally include a fitting 64 used in connecting the accumulator 14 with the draft tube 12 and/or connecting a stack tower to the large bubble mixer 10. While a portion of the fitting 64 may extend above the top of the accumulator 14, it will be appreciated that any such extension above the accumulator 14 may be nominal and/or that the fitting 64 may terminate at or below the top of the accumulator 14.

It will be appreciated that the size, volume, discharge velocity, and discharge rate or frequency of the large bubbles can vary depending on the embodiment of large bubble mixer 10, depending in part on its dimensions and other factors. The size and shape of the large bubble(s) being discharged from draft tube 12 of large bubble mixer 10 depend on various factors, including for example, volume of accumulator 14, diameter $D_T$ or cross-sectional area of draft tube 12, size and shape of inlet(s) 30, distance $H_1$ from the top of accumulator 14 to the top of inlet(s) 30, along with other various factors. It will be appreciated that each time the large bubble mixer 10 generates a bubble, the volume of the bubble may be relatively constant. Further, the size or volume of the generated bubble does not necessarily depend on the rate at which the air accumulator 14 captures air from the pipes 60 or other source of gas, as the air rate may impact the frequency of the discharges rather than the size of the bubble in each discharge.

The total volume of each bubble released by large bubble mixer 10 is generally a fixed volume, but the method of measuring volume can vary. One such method of measuring the volume of large bubble is by determining the volumetric size of the accumulator 14. When the accumulator 14 reaches maximum capacity, substantially all of the air or gas in the accumulator 14 will be generally discharged as one large bubble. The air accumulator 14 will not discharge unless maximum capacity is reached, ensuring a generally constant and consistent bubble size. The amount, volume, and frequency of the bubbles being discharged from draft tube 12 depend on various factors, including the size and volume of the accumulator 14 (including its cross-sectional area and height $H_1$), and the amount of air or gas capture by the accumulator 14, for example. Similarly, the velocity of the bubbles being discharged from draft tube 12 may depend on various factors, including the size and volume of the accumulator 14, diameter $D_T$ or cross-sectional area of draft tube 12, size and shape of inlet(s) 30, depth or distance of accumulator 14 below the surface of the wastewater, depth or distance of opening 32 of draft tube 12 below the surface of the wastewater, and composition and makeup of the wastewater. As mentioned above, based on the velocity at which the large bubbles exit the large bubble mixer 10, the release of each large bubble may generate an impulse or shockwave within the wastewater. The exit velocity of the large bubbles may be between about 10 ft/s and about 40 ft/s in one embodiment, between about 20 ft/s and about 30 ft/s in another embodiment, and between about 23 ft/s and about 28 ft/s in yet another embodiment. The exit velocity of the large bubbles may be between 2 times and 20 times greater than the free release velocity of such bubbles. Similarly, the exit velocity of the large bubbles may be multiple times greater than the terminal velocity of comparable bubbles within the wastewater. Put differently, the exit velocity of the large bubbles may be multiple times greater than conventional airlift pumps with a continuous discharge, some of which can have a maximum velocity of about 4 ft/s. Again, the impulse or shockwave within the wastewater created by the release of the large bubble results in further disruption or mixing within the wastewater, in addition to that created by the upward movement and/or bursting or breaking up of the large bubble.

Large bubble mixer 10 can be constructed of varying sizes, depending on the embodiment and needs of the system. FIGS. 1-3 demonstrate one embodiment of a large bubble mixer 10. In that illustrated embodiment, large bubble mixer 10 may comprise an accumulator diameter $D_A$ of between about 12 inches or less to about 36 inches or more in one embodiment, between about 15 inches to about 30 inches in another embodiment, and between about 17 inches to about 22 inches in a further embodiment. Large bubble mixer 10 may have an accumulator height $H_1$ of between about 4 inches or less to about 18 inches or more in one embodiment, between about 5 inches to about 10 inches in another embodiment, and between about 6 inches to about 8 inches in a further embodiment. Similarly, the illustrated embodiment may comprise an overall height H of between about 8 inches or less to about 24 inches or more in one embodiment, between about 10 inches to about 18 inches in another embodiment, and between about 12 inches to about 14 inches in a further embodiment. Additionally, one embodiment of large bubble mixer 10 may comprise a draft tube diameter $D_T$ of between about 2 inches or less to about 12 inches or more in one embodiment, between about 4 inches to about 8 inches in another embodiment, and between about 4 inches to about 6 inches in a further embodiment. Further yet, it will be appreciated that based on certain factors (e.g., shape, profile and height of accumulator 14, position of the inlet(s) 30, and diameter $D_T$ of the draft tube 12), the effective volume of the accumulator 14 and/or volume of each large bubble generated may be between about 0.25 ft³ or less to about 5.0 ft³ or more in one embodiment, between about 0.5 ft³ to about 3.0 ft³ in another embodiment, and between about 0.5 ft³ to about 1.5 ft³ in a further embodiment. In one embodiment, each large bubble is about 0.5 ft³, in another embodiment each large bubble is about 1.0 ft³, and in a further embodiment each large bubble is about 1.5 ft³.

Based on the measurements and parameters set forth above, the ratio of the accumulator diameter $D_A$ to the overall height H of the large bubble mixer 10 (both being measured in inches for example) may be between about 0.5 or less to about 4.0 or more in one embodiment, between about 0.75 to about 2.0 in another embodiment, and between about 1.0 to about 1.5 in a further embodiment.

As set forth above, to generate large bubbles, large bubble mixer 10 can be connected or otherwise in generally in communication with a gas or air line or other source of gas. In one embodiment, large bubble mixer 10 is connected to a lateral air distribution pipe, such as the pipe 60, which may be submerged or may be floating on the surface of the liquid, or other suitable sources of gas or oxygen. Pipe 60 may be constructed from any suitable material including, but not limited to, PVC, CPVC, ABS, stainless steel, galvanized iron, galvanized steel, and other suitable materials. A low pressure source of gas or oxygen can be supplied to pipe 60, which then in turn, can be used to supply gas or oxygen to large bubble mixer 10 for generating and discharging a large bubble. Gas or oxygen can be supplied from pipe 60 to large bubble mixer 10 in a variety of different methods, including those presently known in the art or methods that have yet to be discovered. In one such method, a lateral hose, pipe, or other apparatus extending from pipe 60 can be positioned below large bubble mixer 10, specifically below skirt 20 of accumulator 14. The discharged gas or oxygen can then proceed upwardly, be captured by skirt 20, fill accumulator 14, and then discharged as a large bubble in the manner described herein. As set forth above, a source of gas from pipe 60 may be connected directly to accumulator 14.

In another alternative method, fine bubble diffusers 50 can be used to supply gas or oxygen to large bubble mixer 10. In this method, at least one fine bubble diffuser 50 is located below and at least partially covered by a large bubble mixer 10. As gas is diffused from fine bubble diffuser 50, a percentage of the diffused fine bubbles are captured by the large bubble mixer 10 in the manner described herein. In this alternative method of supplying gas or oxygen to large bubble mixer 10, the wastewater receives the benefit of oxygen transfer from the fine bubble diffuser 50 in addition to the mixing generated by the large bubble discharged from large bubble mixer 10. This method of supplying gas or oxygen is not limited to any specific type or construction of fine bubble diffuser 50. It will be appreciated that any number of fine bubble diffuser designs can be used including, without limitation, disc diffusers, panel diffusers, tube diffusers, or any other suitable type of fine bubble diffuser now known or hereafter developed, or combinations thereof.

It can be envisioned that alternative embodiments of large bubble mixer 10 are possible. Such an alternative embodiment can comprise one or more water intake inlets (as shown in U.S. patent application Ser. No. 16/413,747) for pumpage and is within the scope of the present invention. This alternate embodiment could be used when pumpage is a desired outcome when using large bubble mixer 10. This alternative design of large bubble mixer 10 can comprise at least one water intake inlet located in a lower region of draft tube 12. In this alternative embodiment, water (and anything contained therein, such as sludge, mud, or debris) can be drawn through water intake inlet 36, pumped through draft tube 12, and expelled from opening 32 along with discharged large bubble during each discharge in the discharge cycle. This particular embodiment of large bubble mixer 10 could be used in deep treatment tanks or lagoons, where it is beneficial to draw sludge from the bottom of the tank or lagoon. However, it can be envisioned that special pumpage could be desirable in other settings, and therefore, alternate large bubble mixer 10 comprising a water intake inlet could be used in a variety of settings. In a yet further embodiment, inlet may optionally be capped, plugged other otherwise generally sealed in order to prevent pumpage. Other alternative embodiments may include a relatively short stack pipe extending upwardly from the top end of accumulator 14. Short stack pipe may either be an extension of draft tube 12 or may be a separate tube or pipe attached to large bubble mixer 10.

System and Method of Using Large Bubble Mixer and with Diffusers in a WWTS

The present invention is also directed generally to a system and method of using at least one large bubble mixer 10 and at least one diffuser, such as a fine bubble diffuser 50, to treat wastewater in a basin, lagoon, reservoir, or any other wastewater treatment area 102 within a wastewater treatment system (WWTS) 100. As generally illustrated by FIGS. 4A-5 and 7, the system and method may include using a plurality of large bubble mixers 10 and a plurality of fine bubble diffuser 50 arranged in a wastewater treatment area 102. It will be appreciated that both the number and placement of both the large bubble mixers 10 and fine bubble diffusers 50 can vary for several reasons, including but not limited to, the size of the treatment area, the depth of the treatment area, and the desired primary intent, for example, whether the primary intent is to mix or aerate the wastewater, among other factors. It will further be appreciated that wastewater treatment area 102 could be a lagoon, concrete basin, tank, or other suitable treatment area. As generally illustrated by FIG. 6, another system and method may include using only a plurality of large bubble mixers 10 arranged in a wastewater treatment area 102

Figure 5:
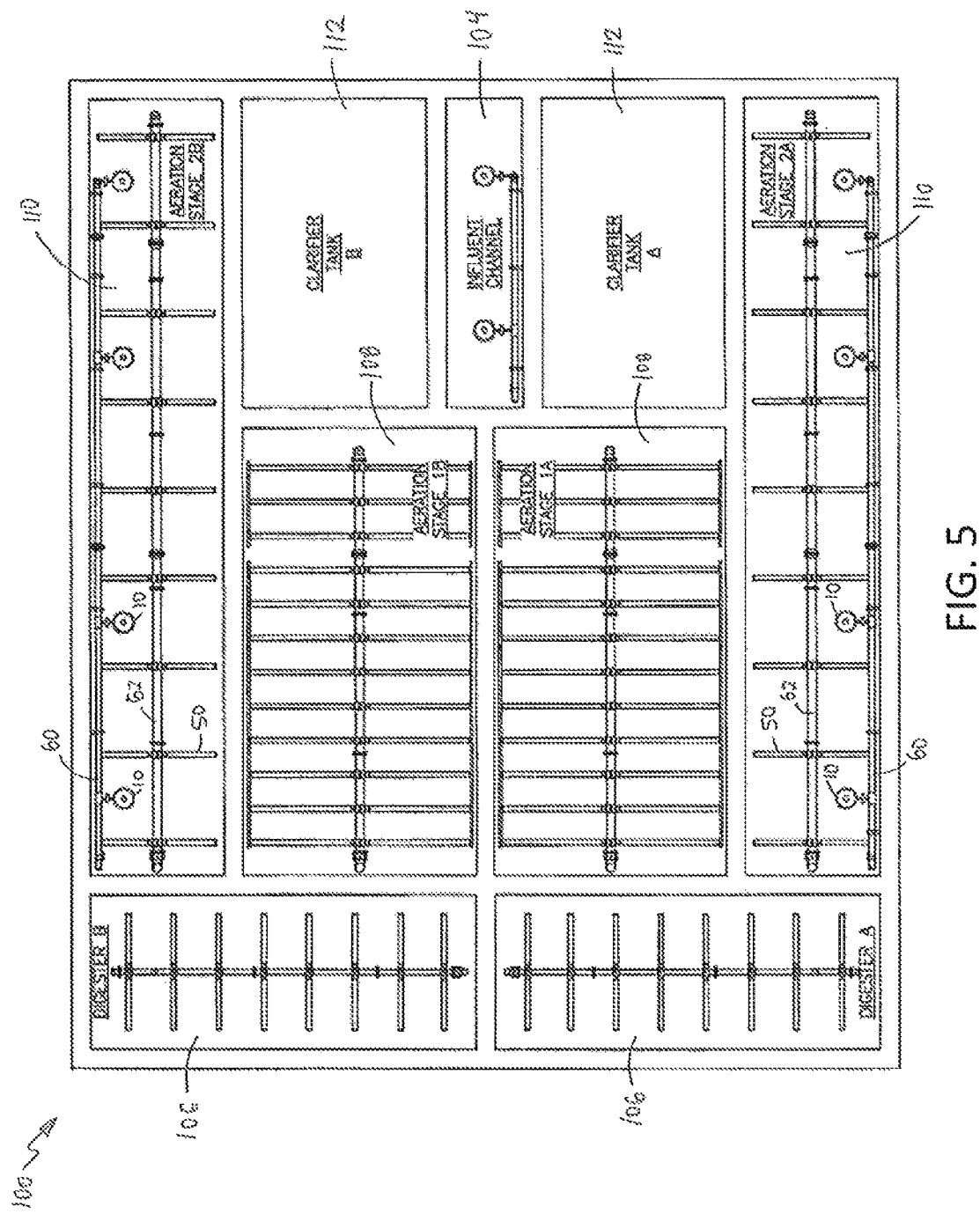
FIG. 5 is a schematic layout of a wastewater treatment system utilizing a plurality of large or big bubble mixers and a plurality of fine bubble diffusers in accordance with another embodiment of the present invention.
Figure 6:
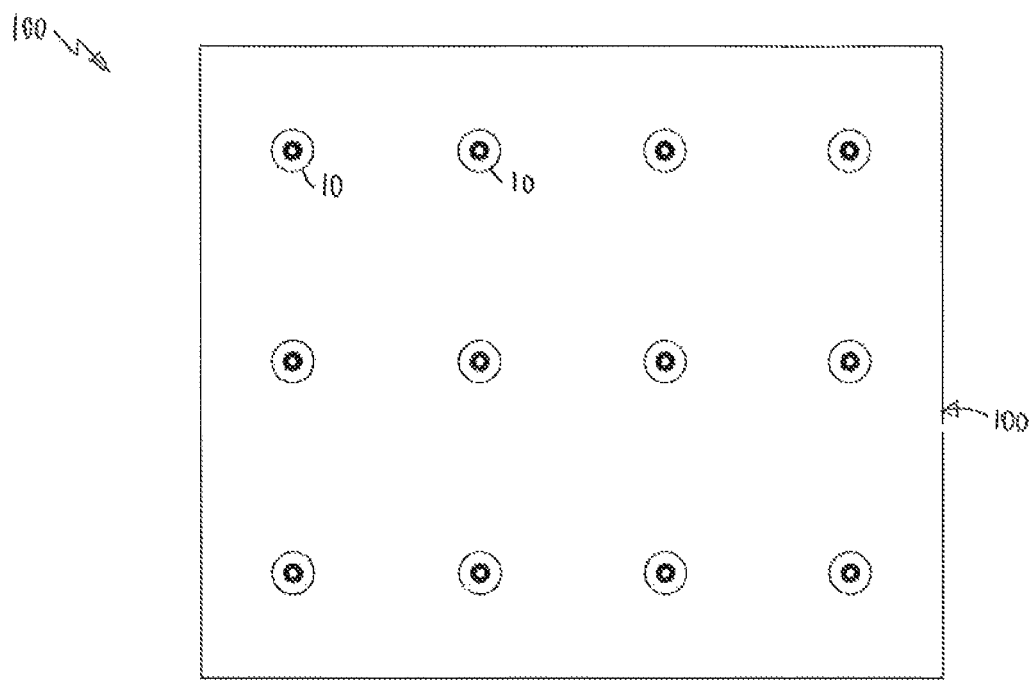
FIG. 6 is a schematic layout of a wastewater treatment system utilizing a plurality of large or big bubble mixers in accordance with another embodiment of the present invention.
Figure 7:
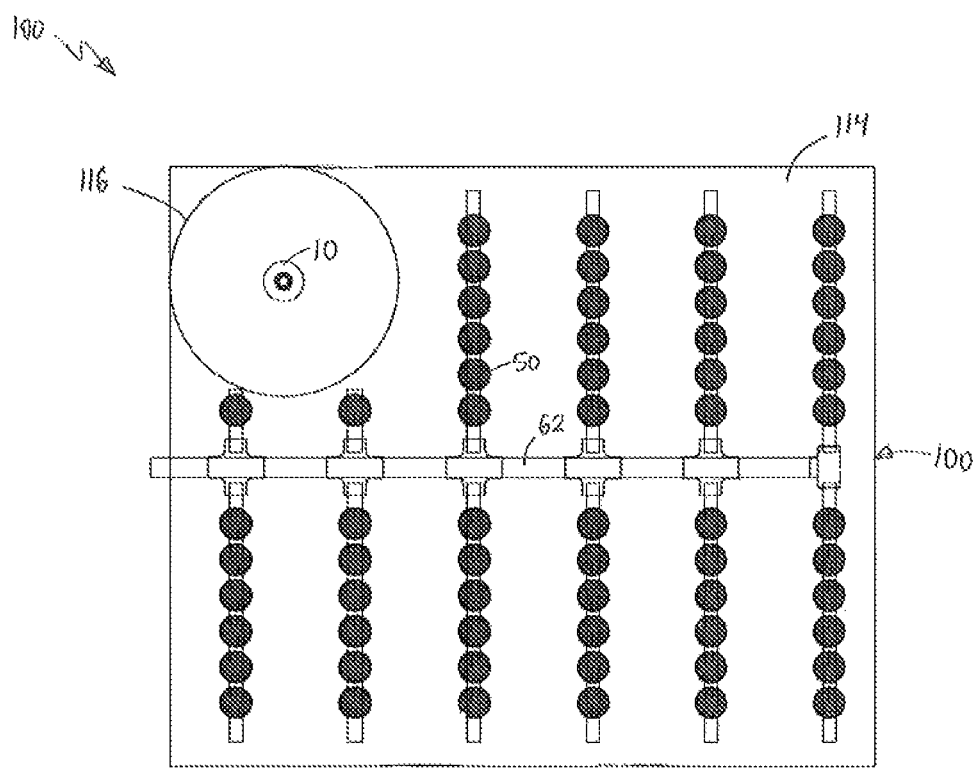
FIG. 7 is a schematic layout of a wastewater treatment system utilizing a plurality of fine bubble diffusers and including a tank with a large or big bubble mixer placed therein in accordance with another embodiment of the present invention.

As demonstrated in FIGS. 4A-5 and 7, the system and method for treating wastewater according to one embodiment comprises a plurality of large bubble mixers 10, a plurality of fine bubble diffusers 50, at least one aeration blower (not shown), one or more air control valves 52, an optional control system (not shown), lateral air supply or distribution pipes 60 in communication with the large bubble mixers 10, and lateral air supply or distribution pipes 62 in communication with the fine bubble diffusers 50. As shown in FIG. 5, the WWTS 100 may include various sections, tanks, or basins including, but not limited to, an influent channel 104, a digester 106, a first aeration stage 108, a second aeration stage 110, and a clarifier tank 112. As shown in FIG. 5, the WWTS 100 may include an aeration basin 114 with a plurality of fine bubble diffusers 50, and an anoxic tank 16 with at least one large bubble mixer 10.

One advantage to this system and method is that lower pressure blowers may be utilized for supplying gas to both the large bubble mixers 10 and fine bubble diffusers 50. In fact, through the use of control valves 52, a single blower may be utilized. The blower and/or valves 52 may be manually controlled or may be partially or fully automated through use of a control system. In cases of retrofitting or modifying an existing WWTS 100, such low pressure blowers or other air sources may already be in place, thus not requiring additional blowers or compressors (e.g., high pressure compressors required for known coarse or big bubble mixers) to be added.

The supply of gas or air to the large bubble mixers 10 may be controlled independently from the supply of gas or air to the fine bubble diffusers 50. In other words, there may be a positive split between the gas supplied to the large bubble mixers 10 and the gas supplied to the fine bubble diffusers 50. Accordingly, the flow (and flowrate) of gas via distribution pipes 60 into the large bubble mixers 10 can be entirely independent from the flow (and flowrate) of gas via distribution pipes 62 into the fine bubble diffusers 50. This can permit for variable and desired rates of aeration and mixing that may be independent of one another. It may also permit variable aeration and independent mixing frequency and intensity. In other words, the rate of mixing achieved by the large bubble mixers 10 may be changed without having to change the amount of aeration from the fine bubble diffusers 50. Similarly, the amount of aeration from the fine bubble diffusers 50 can be changed without having to change the rate of mixing achieved by the large bubble mixers 10.

It will further be appreciated that distribution pipes 60 may be arranged such that gas may be supplied to a single large bubble mixer 10, a portion of the large bubble mixers 10, or all of the large bubble mixers 10. In such an embodiment, individual and unique air control to each large bubble mixer 10 can be achieved. This arrangement can be particularly beneficial in controlling certain sections of the wastewater treatment system, wherein gas may be supplied to a number of large bubble mixers 10 in a one area to provide mixing in that area, while gas is not supplied to large bubble mixers 10 in another areas. Similarly, gas may be supplied to only a portion or to all of the fine bubble diffusers 50, thereby providing similar selectivity.

Regardless of whether gas is supplied to some or all of the large bubble mixers 10, and whether gas is supplied to some or all of the fine bubble diffusers 50, the system and method herein is directed to the functionality of having independent control of the large bubble mixers 10 and fine bubble diffusers 50, such that the system may be operated in multiple modes of operation, including a first mode of operation, a second mode of operation, a third mode of operation, a fourth mode of operation, etc., as described in greater detail below.

During a first mode of operation, no gas (or substantially no gas) is distributed to either large bubble mixers 10 or fine bubble diffusers 50. In this first mode of operation, there is no mixing of the wastewater because no gas is supplied to large bubble mixers 10 for large bubble generation. Further, there is no aeration of the wastewater because no gas is supplied to fine bubble diffusers 50 for fine bubble diffusion. In this first mode of operation, the treatment, may be similar to that of a non-aerated and non-mixed lagoon.

During a second mode of operation, gas is distributed only to large bubble mixers 10 and there is no gas (or substantially no gas) distributed to fine bubble diffusers 50. In this second mode of operation, large bubble mixers 10 provide the mixing capabilities described herein, providing the disruption and churning of the wastewater. This mode of operation can be useful when the desired outcome is to mix or churn the wastewater with little to no oxygen transfer. It will be appreciated that exact uniform flowrate, fill rate, and discharge rate of the large bubble mixers 10 in treatment area 102 is not always a feasible option. For example, when air is supplied to multiple units connected by the same line of pipe 60, there can be variance of air rate due to hydraulic losses. It will further be appreciated that large bubble mixers 10 in treatment area 102 may discharge bubbles at different times and at different rates relative to one another. As such, at any given time, any one large bubble mixer 10 may be filled with gas and discharge the large bubble, independent of all other large bubble mixers 10 in treatment area 102. This non-uniform discharge of large bubbles can actually be a benefit, because it may provide for almost continuous random discharge of large bubbles and constant mixing of the wastewater via "interfering currents."

During a third mode of operation, gas is distributed only to fine bubble diffusers 50 and there is no gas (or substantially no gas) distributed to large bubble mixers 10. In this third mode of operation, gas supplied to fine bubble diffusers 50 can be diffused into the wastewater for high-efficiency transfer of oxygen into the wastewater to promote bacterial growth, with moderate mixing created by fine bubble diffusers 50. Such a mode of operation is comparable to a traditional fine bubble diffusion treatment system.

During a fourth mode of operation, gas is distributed and supplied to both large bubble mixers 10 and fine bubble diffusers 50. This fourth mode of operation would be desirable in scenarios where mixing, churning, and disruption of the wastewater is required, as well as a demand for highly efficient oxygen transfer in the wastewater for aerobic treatment, and for the reasons stated above. This may be particularly advantageous in treatment areas that develop sludge or other large solids, as the fine bubbles diffused by fine bubble diffusers 50 do not generate the disruption or mixing power needed to mix the treatment area 102. This mode of operation could also be particularly beneficial in Moving Bed Biofilm Reactor ("MBBR") units, which utilize microfilm carriers in the wastewater. MBBR units require high oxygen demand for aerobic treatment, and fine bubble diffusers 50 are particularly suited to meet this high oxygen demand. In addition to requiring high oxygen amounts for treatment, MBBR units are more efficient when biofilm carriers present in the reactors move freely through the wastewater, collecting bacteria to promote bacterial growth. The movement of the biofilm carriers can be aided by large bubble mixers 10, which are likewise well-suited for mixing and disrupting the wastewater, providing greater mixing than fine bubble diffusers 50, particularly to prevent media rafting in the MBBR.

During even further modes of operation, various and varying degrees of gas flowrates may be supplied to either one or both large bubble mixers 10 and fine bubble diffusers 50. As such, the gas flowrates may be such that desired amounts and combinations of mixing and aeration may be achieved. It will be appreciated that the modes of operation described herein are non-limiting examples and not an exhaustive list thereof.

It will be understood that one, two, three, four or more modes of operation may be implemented in a WWTS 100 over any given period based on variety of factors and parameters. For example, when certain conditions are met or certain thresholds are triggered, there may be a transition for one mode of operation to another mode of operation. The transitions between one or more modes of operation may be intermittent, temporary, cyclical, sequential, varying in duration, or more permanent or semi-permanent in nature. By way of non-limiting example, the third mode of operation (wherein gas is distributed only to fine bubble diffusers 50) may be intermittently transitioned back and forth from the fourth mode of operation (wherein gas is distributed to both fine bubble diffusers 50 and large bubble mixers 10) such that constant oxygen transfer may be supplemented with intermittent mixing. In another non-limiting example, the second mode of operation (wherein gas is distributed only to large bubble mixers 10) may be intermittently transitioned back and forth from the fourth mode of operation (wherein gas is distributed to both fine bubble diffusers 50 and large bubble mixers 10) such that constant mixing may be supplemented with intermittent oxygen transfer. Of course, a wide array of other operational sequences and transitions are also well within the scope of the present invention.

It will be understood that the system may be operated in a manner to create anaerobic, anoxic and/or aerobic conditions or environments within various reaction zones within the system, and at various times during the treatment process based on a variety of conditions and parameters.

From the foregoing, it will be seen that this invention is one well adapted to attain all the ends and objects hereinabove set forth together with other advantages which are inherent to the structure and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is, therefore, contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A large bubble mixer configured for releasing large bubbles into wastewater, the large bubble mixer comprising:
    a draft tube having a vertically-extending sidewall;

an upwardly-extending member surrounding at least a portion of the draft tube, wherein the upwardly-extending member includes an upper end and a lower end;

an inner chamber area defined between the draft tube and the upwardly-extending member;

an accumulator having a downwardly-depending peripheral skirt surrounding at least a portion of the draft tube and at least a portion of the upwardly-extending member;

an outer chamber area defined between the upwardly-extending member and the peripheral skirt of the accumulator; and at least one air inlet defined in the draft tube in an area generally surrounded by the upwardly-extending member;

wherein a lower end of the draft tube sidewall is sealed beneath the lower end of the upwardly-extending member.

2. The large bubble mixer of claim 1, wherein the lower end of the draft tube sidewall does not have any through openings defined beneath the lower end of the upwardly-extending member.

3. The large bubble mixer of claim 1, wherein the sealed lower end of the draft tube generally prevents liquid pumpage through the draft tube.

4. The large bubble mixer of claim 1, wherein the draft tube does not extend above an upper end of the accumulator.

5. The large bubble mixer of claim 1, wherein the large bubble mixer is configured to release the large bubbles at an exit velocity that generates an impulse or shockwave within the wastewater.

6. The large bubble mixer of claim 1, wherein the large bubble mixer is configured to release the large bubbles at an exit velocity of between 10 ft/s and 40 ft/s.

7. The large bubble mixer of claim 1, wherein the large bubble mixer is configured to release the large bubbles at an exit velocity of between 20 ft/s and 30 ft/s.

* * * * *